US012612508B2

(12) United States Patent
Yoshida et al.

(10) Patent No.: US 12,612,508 B2
(45) Date of Patent: Apr. 28, 2026

(54) HOT PRESS CUSHIONING MATERIAL

(71) Applicant: YAMAUCHI CORP., Hirakata (JP)

(72) Inventors: Akira Yoshida, Kanuma (JP); Shuhei Kouno, Kanuma (JP); Shigeo Hoshino, Kanuma (JP)

(73) Assignee: YAMAUCHI CORP., Hirakata (JP)

( * ) Notice: Subject to any disclaimer, the term of this patent is extended or adjusted under 35 U.S.C. 154(b) by 844 days.

(21) Appl. No.: 17/765,851

(22) PCT Filed: Oct. 27, 2020

(86) PCT No.: PCT/JP2020/040179
    § 371 (c)(1),
    (2) Date: Apr. 1, 2022

(87) PCT Pub. No.: WO2021/085403
    PCT Pub. Date: May 6, 2021

(65) Prior Publication Data
    US 2022/0332920 A1      Oct. 20, 2022

(30) Foreign Application Priority Data

Oct. 29, 2019    (JP) ................................. 2019-196612

(51) Int. Cl.
    *C08K 3/22*          (2006.01)
    *B29C 43/32*        (2006.01)
    *B30B 15/06*        (2006.01)
    *C08J 5/18*          (2006.01)

(52) U.S. Cl.
    CPC ................ *C08K 3/22* (2013.01); *B29C 43/32* (2013.01); *B30B 15/061* (2013.01); *C08J 5/18* (2013.01); *B29K 2819/00* (2013.01); *C08J*

*2315/02* (2013.01); *C08K 2003/2206* (2013.01); *C08K 2003/222* (2013.01); *C08K 2201/006* (2013.01); *C08K 2201/014* (2013.01)

(58) Field of Classification Search
    CPC .............. C08K 3/22; C08K 2003/2206; C08K 2003/222; C08K 2201/006; C08K 2201/014; C08J 5/18; C08J 2315/02
    See application file for complete search history.

(56) References Cited

U.S. PATENT DOCUMENTS

2021/0292180 A1*  9/2021  Gordon ..................... C01F 5/22
2021/0395586 A1*  12/2021  Takeyama ............ C08F 214/22

FOREIGN PATENT DOCUMENTS

| CN | 109880238 A | 6/2019 |
| JP | 50-027027 Y | 8/1975 |
| JP | 06-278153 A | 10/1994 |
| JP | 08-224849 A | 9/1996 |
| JP | 2004168825 A | 6/2004 |

(Continued)

OTHER PUBLICATIONS

Kyowa Chemical Industry, Kyowamag 150, 2022 (Year: 2022).*

(Continued)

*Primary Examiner* — Robert S Jones, Jr.
*Assistant Examiner* — Elizabeth Amato
(74) *Attorney, Agent, or Firm* — HAUPTMAN HAM, LLP

(57) ABSTRACT

A hot press cushioning material includes fluororubber. A composition of the fluororubber includes a fluororubber component, a vulcanizing agent, an acid acceptor, and a dehydrating agent.

5 Claims, 2 Drawing Sheets

(56) References Cited

FOREIGN PATENT DOCUMENTS

| JP | 2008-007703 | A | 1/2008 |
| JP | 2013-132889 | A | 7/2013 |
| WO | 2014061558 | A1 | 4/2014 |

OTHER PUBLICATIONS

International Search Report issued in corresponding International Application No. PCT/JP2020/040179, mailed Dec. 8, 2020, pp. 1-2, Japan Patent Office, Tokyo, Japan.

Peng, Jing Yu, "Fiber plate production Process", China Forestry Publishing House, p. 78, May 1989.

Dan, Xiao Gen, "Plastic mold design", Xidian University Press, p. 18-20, Aug. 2007.

Liu, Shang Le, "Epoxy Adhesive", Shanxi People's Publishing House, p. 238, Dec. 1978.

Extended European Search Report issued in corresponding European Application No. 20883644.5, dated Nov. 6, 2023, pp. 1-8.

Shimada et al, Shiro, "Thermal Analysis of Decomposition of $MgCl2 \cdot 6H2O$ and Reactivity of MgO", Industrial Chemistry Journal, The Chemical Society of Japan, 1971 vol. 74 No. 10, p. 46-52.

Tomomasa et al, Yoshio, "Alumina Products to Reduce Environmental Impact", Sumitomo Chemical 2000-II, Sumitomo Chemical Co., Ltd., Nov. 25, 2000.

Showa Chemical Co. Ltd., "MSDS of Magnesium sulfate heptahydrate".

* cited by examiner (A)

(B)

(C)

13 HEATING PLATEN

11 CUSHIONING MATERIAL

12 LAMINATE MATERIAL

11 CUSHIONING MATERIAL

13 HEATING PLATEN

HOT PRESS CUSHIONING MATERIAL

CROSS-REFERENCE TO RELATED APPLICATIONS

The present application is a National Phase of International Application Number PCT/JP2020/040179, filed Oct. 27, 2020, which claims priority to Japanese Patent Application No. 2019-196612, filed Oct. 29, 2019, both which are hereby incorporated by reference in their entirety.

TECHNICAL FIELD

The present invention relates to hot press cushioning materials. More particularly, the present invention relates to hot press cushioning materials that are used when press forming or thermocompression bonding an intended product in the process of manufacturing a precision equipment component such as: a copper clad laminate; a printed circuit board like a flexible printed circuit board, a rigid flex board, a multilayer board, or a multilayer flexible printed circuit board; an insulating board; a credit card; an IC card; a liquid crystal display panel; or a ceramic laminate, a melamine decorative laminated sheet, etc. (hereinafter referred to as a "laminate" in the present invention).

BACKGROUND ART

As shown in FIG. 3, when manufacturing a laminate such as a printed circuit board, a method in which a laminate material 12 that is an object to be pressed is placed between heating platens 13, 13 that are heating and pressing means and a certain pressure and heat are applied to the laminate material 12 is used in a press forming or thermocompression bonding process. In order to produce an accurate formed product, it is necessary to uniformly apply heat and pressure to the entire surface of the laminate material 12 during hot press. For this purpose, hot press is performed with a flat plate-like cushioning material 11 interposed between each heating platen 13 and the laminate material 12. A stainless steel mirror plate is sometimes interposed between the laminate material 12 and each cushioning material 11.

General characteristics required for the cushioning material 11 include: cushioning properties that absorb irregularities of the heating platen 13 and the laminate material 12; in-plane uniformity for uniformly transferring heat and pressure from the heating platen 13 to the entire press surface of the laminate material 12; heat transfer properties for efficiently transferring heat from the heating platen 13 to the laminate material 12; and heat resistance high enough to withstand the press temperature.

Cushioning materials using synthetic rubber have been provided as such a cushioning material. Such cushioning materials typically are laminates of a woven or non-woven fabric layer made of heat resistant fibers such as glass fibers or aromatic polyamide fibers and a synthetic rubber layer. It is also known to bond a surface layer such as a fluororesin film to the surfaces of the cushioning material in order to give releasability to the cushioning material.

An example of such a cushioning material is Japanese Unexamined Patent Application Publication No. H06-278153 (Patent Literature 1). Patent Literature 1 discloses a forming press cushioning material including: a cushioning material body having a fluororubber layer; and surface layers. The fluororubber layer is composed of a fluororubber raw material, an acid acceptor, and a vulcanizing agent.

CITATION LIST

Patent Literatures

Patent Literature 1: Japanese Unexamined Patent Application Publication No. H06-278153

SUMMARY OF INVENTION

Technical Problem

Although the forming press cushioning material of Patent Literature 1 uses an acid acceptor and a vulcanizing agent in order to improve heat resistance, it is desired to further improve the heat resistance.

When the forming press cushioning material of Patent Literature 1 is used at high temperatures, hydrogen fluoride (corrosive gas) is generated from fluororubber during use, which may cause corrosion of a heating platen. The forming press cushioning material of Patent Literature 1 therefore contains a relatively large amount of acid acceptor in order to reduce generation of hydrogen fluoride. However, even the forming press cushioning material containing a relatively large amount of acid acceptor sometimes causes corrosion of a heating platan when used at temperatures as high as 230° C. to 250° C. Moreover, the cushioning properties of the forming press cushioning material of Patent Literature 1 sometimes degrade when repeatedly used at high temperatures.

The present invention was made to solve the above problems, and it is an object of the present invention to provide a hot press cushioning material whose heat resistance can be improved, specifically, that firstly can reduce corrosion of a heating platen even when used at high temperatures and secondly reduce degradation in cushioning properties even when repeatedly used at high temperatures.

Solution to Problem

A hot press cushioning material according to a first aspect of the present invention is a hot press cushioning material including fluororubber. A composition of the fluororubber includes a fluororubber component, a vulcanizing agent, an acid acceptor, and a dehydrating agent. The acid acceptor serves to cause a neutralization reaction with hydrogen fluoride that is generated due to degradation in the fluororubber and that causes corrosion of a heating platen. The dehydrating agent serves to absorb moisture in the fluororubber.

Preferably, an amount of the dehydrating agent per 100 parts by mass of a total of the fluororubber component and the vulcanizing agent is larger than an amount of the acid acceptor.

Preferably, the amount of the dehydrating agent per 100 parts by mass of the total of the fluororubber component and the vulcanizing agent is 1.5 times or more the amount of the acid acceptor.

Preferably, a total amount of the acid acceptor and the dehydrating agent per 100 parts by mass of the total of the fluororubber component and the vulcanizing agent is 3 to 50 parts by mass.

Preferably, the acid acceptor includes at least one selected from the group consisting of magnesium oxide, zinc oxide, lead oxide, dibasic phosphate, and hydrotalcite.

Preferably, the dehydrating agent includes at least one selected from the group consisting of calcium oxide, aluminum oxide, magnesium sulfate, and magnesium chloride.

Preferably, the acid acceptor is magnesium oxide, and the dehydrating agent is calcium oxide.

Preferably, a mass ratio of the magnesium oxide to the calcium oxide is the magnesium oxide: the calcium oxide=1:4 to 2:3.

Preferably, the magnesium oxide has a BET specific surface area of 80 m²/g or more and 300 m²/g or less. More preferably, the magnesium oxide has a BET specific surface area of 100 m²/g or more and 260 m²/g or less.

Preferably, a heat resistant temperature of the hot press cushioning material is 250° C. or more and 300° C. or less.

Advantageous Effects of Invention

According to the present invention, heat resistance can be improved. Specifically, the hot press cushioning material firstly can reduce corrosion of a heating platen even when used at high temperatures, and secondly can reduce degradation in cushioning properties even when repeatedly used at high temperatures.

DESCRIPTION OF EMBODIMENTS

An embodiment of the present invention will be described in detail with reference to the drawings. The same or corresponding parts are denoted by the same reference signs throughout the drawings, and description thereof will not be repeated.

<Hot Press Cushioning Material>

FIGS. 1(A) to (D) show specific configuration examples of a hot press cushioning material according to the present embodiment. Configuration examples of hot press cushioning materials 1A to 1D according to the present embodiment will be described with reference to FIGS. 1(A) to (D). The hot press cushioning materials 1A to 1D of the present embodiment contain fluororubber.

Figure 1:
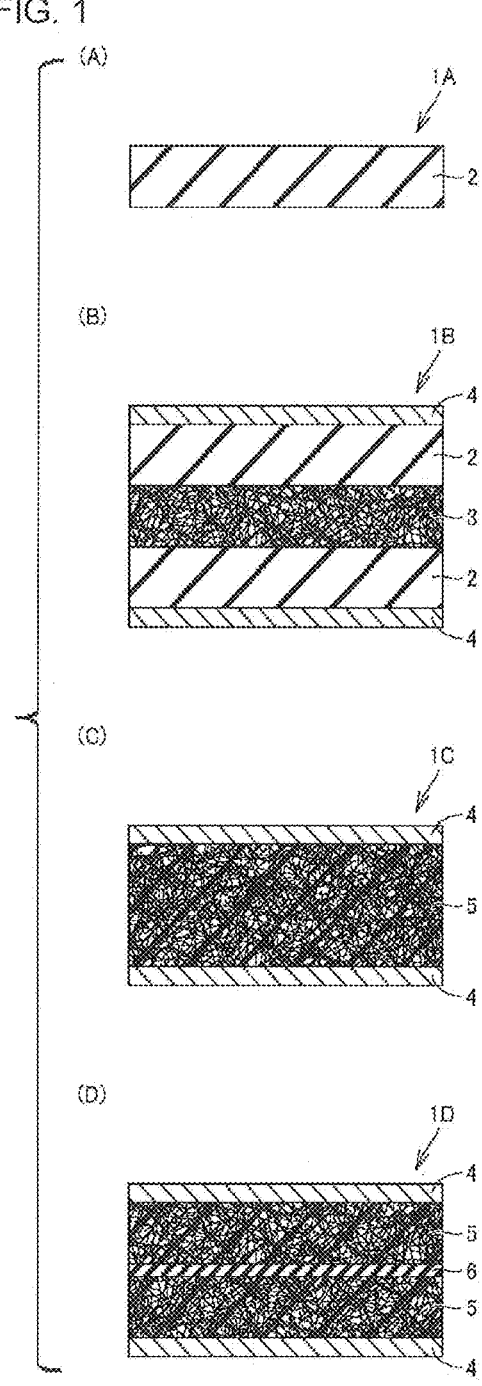
FIG. 1 shows schematic diagrams of a hot press cushioning material according to an embodiment of the present invention.

The hot press cushioning material 1A shown in FIG. 1(A) is a fluororubber sheet composed only of a fluororubber layer 2. Surface layers made of paper, woven fabric, non-woven fabric, a synthetic resin film, etc. may be stacked on the front and back surfaces of the fluororubber layer 2.

The hot press cushioning material 1B shown in FIG. 1(B) includes: a non-woven fabric layer 3 made of non-woven fabric; two fluororubber layers 2 sandwiching the non-woven fabric layer 3 from above and below; and surface layers 4 made of a synthetic resin film and attached to the front and back surfaces of the two fluororubber layers 2.

The hot press cushioning material 1C shown in FIG. 1(C) includes: a base material layer 5 made of a fiber-rubber composite material that is woven fabric impregnated with fluororubber; and surface layers 4 made of a synthetic resin film and attached to the front and back surfaces of the base material layer 5 made of a fiber-rubber composite material. The fiber-rubber composite material of the base material layer 5 contains fluororubber.

The hot press cushioning material 1D shown in FIG. 1(D) includes: two base material layers 5 made of a fiber-rubber composite material; an adhesive layer 6 made of fluororubber and bonding the two base material layers 5 together; and surface layers 4 made of a synthetic resin film and attached to the front and back surfaces of the two base material layers 5. The fiber-rubber composite material of the base material layers 5 and the adhesive layer 6 contain fluororubber.

Such hot press cushioning materials 1A to 1D can be used at high temperatures, and their heat resistant temperature is 250° C. or more and 300° C. or less. When the hot press cushioning materials 1A to 1D are used at temperatures above 300° C., their cushioning properties may significantly degrade after repeated use.

As described above, the fluororubber according to the present embodiment includes, for example, a fluororubber sheet, fluororubber with which a base material has been impregnated, and an adhesive material made of fluororubber. That is, the fluororubber need not necessarily form a layer by itself, and may be in the following form: fluororubber with which fibers etc. have been impregnated, or fluororubber adhering to fibers etc. The hot press cushioning materials 1A to 1D of FIGS. 1(A) to (D) are by way of example only. The hot press cushioning material of the present invention is not limited to the above configurations as long as it includes the configuration of fluororubber that will be described below.

Fluororubber that is used for the hot press cushioning material will be described in detail.

<Fluororubber>

The composition of fluororubber includes a fluororubber component as a matrix, a vulcanizing agent, an acid acceptor, and a dehydrating agent.

There are various types of fluororubber components such as a fluorine-containing acrylate polymer, a vinylidene fluoride copolymer, fluorine-containing silicone rubber, fluorine-containing polyester rubber, and a fluorine-containing diene copolymer. The type of the fluororubber component is not particularly limited, and the fluororubber component to be used can be selected as appropriate from these fluororubber components.

The vulcanizing agent can be a vulcanizing agent that is known as a vulcanizing agent for fluororubber, such as an organic peroxide vulcanizing agent, an amine vulcanizing agent, or a polyol vulcanizing agent. The vulcanizing agent is an agent to be added to vulcanize fluororubber.

Fluororubber usually contains an acid acceptor in order to neutralize hydrogen fluoride generated during a vulcanization reaction and facilitate vulcanization. However, since a hot press cushioning material is used at high temperatures, fluororubber generates hydrogen fluoride during use when used for the hot press cushioning material, which may cause degradation in rubber's physical properties or corrosion of a heating platen. Accordingly, in the present embodiment, the acid acceptor is added in order to neutralize hydrogen fluoride that is generated not only during vulcanization but also during use.

For example, the acid acceptor is selected from the group consisting of magnesium oxide, zinc oxide, lead oxide, dibasic lead phosphite, and hydrotalcite. Only one type of acid acceptor may be used, or two or more types of acid acceptors may be used. It is particularly preferable that the acid acceptor be magnesium oxide.

When magnesium oxide is used as the acid acceptor, it is preferable to use high activity magnesium oxide with a BET specific surface area of 80 m²/g or more and 300 m²/g or less. More preferably, the BET specific surface area of magnesium oxide is 100 m²/g or more and 260 m²/g or less.

Since magnesium oxide with a BET specific surface area of 80 m²/g or more has high activity, such magnesium oxide effectively neutralizes hydrogen fluoride generated during use of a hot press cushioning material. Magnesium oxide with a BET specific surface area of more than 300 m²/g may be less dispersible in fluororubber. Magnesium oxide with a BET specific surface area of less than 80 m²/g is low activity magnesium oxide.

The dehydrating agent absorbs moisture in fluororubber. For example, the dehydrating agent is selected from the group consisting of calcium oxide, aluminum oxide, magnesium sulfate, and magnesium chloride. Only one type of dehydrating agent may be used, or two or more types of dehydrating agents may be used. It is particularly preferable that the dehydrating agent be calcium oxide. When calcium oxide is used as the dehydrating agent, it is preferable to use calcium oxide powder with a small particle size.

As a result of intensive studies on the cause of corrosion of a heating platen, the inventors thought that adding an acid acceptor was not enough to prevent corrosion of a heating platen and that moisture in fluororubber greatly contributed to corrosion of a heating platen. The inventors thus arrived at the idea of using a dehydrating agent in order to remove moisture in fluororubber.

The total amount of the acid acceptor and the dehydrating agent per 100 parts by mass of the total of the fluororubber component and the vulcanizing agent is preferably 3 to 50 parts by mass, more preferably 10 to 30 parts by mass. When the total amount of the acid acceptor and the dehydrating agent is less than 3 parts by mass, it may cause degradation in rubber's physical properties or corrosion of a heating platen. When the total amount of the acid acceptor and the dehydrating agent is more than 50 parts by mass, preferable physical properties of fluororubber, namely satisfactory physical properties such as cushioning properties and heat resistance, cannot be obtained, and processability is also reduced.

It is preferable that the amount of the dehydrating agent per 100 parts by mass of the total of the fluororubber component and the vulcanizing agent be larger than the amount of the acid acceptor. Specifically, it is preferable that the amount of the dehydrating agent be 1.5 times or more the amount of the acid acceptor. When the amount of the dehydrating agent per 100 parts by mass of the total of the fluororubber component and the vulcanizing agent is less than 1.5 times the amount of the acid acceptor, the dehydrating agent cannot sufficiently absorb moisture in fluororubber, which may cause corrosion of a heating platen.

When magnesium oxide is used as the acid acceptor and calcium oxide is used as the dehydrating agent, it is more preferable that the mass ratio of magnesium oxide to calcium oxide be magnesium oxide:calcium oxide=1:4 to 2:3.

As described above, the composition of the fluororubber in the present embodiment includes a fluororubber component, a vulcanizing agent, an acid acceptor, and a dehydrating agent. The heat resistant temperature of conventional hot press cushioning materials is 230° C. or more and 250° C. or less, and the conventional hot press cushioning materials can be used only at temperatures equal to or lower than the heat resistant temperature. However, the use of the composition of the fluororubber of the present embodiment allows the hot press cushioning material to be used at temperatures as high as 250° C. or more and 300° C. or less, and thus improves its heat resistance.

Specifically, a first effect is that corrosion of a heating platen is reduced by using the composition of the fluororubber of the present embodiment. This is considered to be because the acid acceptor reduces generation of hydrogen fluoride (corrosive gas) during use of the hot press cushioning material at high temperatures and the dehydrating agent removes moisture in the fluororubber.

Corrosion of a heating platen occurs largely due to moisture in fluororubber. Therefore, corrosion of a heating platen can further be reduced by making the amount of the dehydrating agent larger than the amount of the acid acceptor rather than by merely mixing the dehydrating agent and the acid acceptor. Specifically, corrosion of a heating platen can be effectively reduced by making the amount of the dehydrating agent per 100 parts by mass of the total of the fluororubber component and the vulcanizing agent 1.5 times the amount of the acid acceptor.

A second effect is that the cushioning properties of the hot press cushioning material are maintained by using the composition of the fluororubber of the present embodiment.

When a heating platen is coated to prevent corrosion, there is no need to consider corrosion of the heating platen. However, the hot press cushioning material of the present embodiment has cushioning properties even after repeated use at high temperatures, and can be effectively used even for hot press for which there is no need to consider corrosion of a heating platen.

The fluororubber may contain, for example, a vulcanization accelerator, a plasticizer, a filler, etc. as desired.

EXAMPLES

Hereinafter, the present invention will be described in more detail by using examples. However, the present invention is not limited to these examples.

<Corrosion Test for Heating Platens>

Table 1 shows the mass ratios of raw materials of Examples 1 to 5, and Table 2 shows the mass ratios of raw materials of Comparative Examples 1 to 5. Table 3 specifically shows the raw materials in Tables 1 and 2. Table 4 shows the results of a corrosion test for heating platens.

Example 1

First, raw materials of a fluororubber sheet, namely raw fluororubber as a matrix, an acid acceptor, a dehydrating agent, and a vulcanization accelerator, were prepared. The raw fluororubber DAI-EL G-716 contains an appropriate amount of polyol vulcanizing agent for a fluororubber component. Kyowamag MF-150 (BET specific surface area: 119 m²/g) that is high activity magnesium oxide was used as the acid acceptor. Calcium oxide was used as the dehydrating agent.

After mixing these raw materials at the ratio shown in Table 1, the mixture was vulcanized under pressure of 10 MPa at 185° C. for 30 minutes. The resultant mixture was heated under no pressure at 230° C. for 5 hours as secondary vulcanization to produce a 250 mm×250 mm fluororubber sheet with a thickness of 2 mm.

Example 2

A method for producing a fluororubber sheet of Example 2 is basically similar to Example 1, but is different from Example 1 in the type of calcium oxide used as a dehydrating agent, as shown in Tables 1 and 3 below.

Example 3

A method for producing a fluororubber sheet of Example 3 is basically similar to Example 1, but is different from Example 1 in that MAGSARAT #30 (BET specific surface area: 42 m²/g) that is low activity magnesium oxide was used as an acid acceptor, as shown in Table 1 below.

Example 4

A method for producing a fluororubber sheet of Example 4 is basically similar to Example 1. The same raw materials as Example 1 were used, but the mass ratio between high activity magnesium oxide as an acid acceptor and calcium oxide as a dehydrating agent is different from Example 1, as shown in Table 1 below.

Example 5

A method for producing a fluororubber sheet of Example 5 is basically similar to Example 1. The same raw materials as Example 3 were used, but the mass ratio between low activity magnesium oxide as an acid acceptor and calcium oxide as a dehydrating agent is different from Example 3, as shown in Table 1 below.

Methods for producing fluororubber sheets of Comparative Examples 1 to 5 below are basically similar to Example 1, but are different from Example 1 in the following points.

Comparative Example 1

No dehydrating agent was added in Comparative Example 1.

Comparative Example 2

No acid acceptor was added in Comparative Example 2

Comparative Example 3

In Comparative Example 3, the same raw materials as Examples 1 and 4 were used, but the mass ratio between the acid acceptor and the dehydrating agent is different from Examples 1 and 4. Specifically, the mass ratio of the acid acceptor to the dehydrating agent is acid acceptor:dehydrating agent=4:1.

Comparative Example 4

In Comparative Example 4, the same raw materials as Examples 1 and 4 were used, but the mass ratio between the acid acceptor and the dehydrating agent is different from Examples 1 and 4. Specifically, the mass ratio of the acid acceptor to the dehydrating agent is acid acceptor:dehydrating agent=1:1.

Comparative Example 5

In Comparative Example 5, zinc oxide was used as an acid acceptor in addition to high activity magnesium oxide.

TABLE 1

|  | Composition | Example1 | Example2 | Example3 | Example4 | Example5 |
|---|---|---|---|---|---|---|
| Matrix | Fluororubber (with Vulcanizing Agent) | 100 | 100 | 100 | 100 | 100 |
| Acid Acceptor | High Activity Magnesium Oxide | 5 | 5 | — | 10 | — |
|  | Low Activity Magnesium Oxide | — | — | 5 | — | 10 |
|  | Zinc Oxide | — | — | — | — | — |
| Dehydrating Agent | Calcium Oxide A | 20 | — | 20 | 15 | 15 |
|  | Calcium Oxide B | — | 20 | — | — | — |
| Vulcanization Accelerator | Calcium Hydroxide | 6 | 6 | 6 | 6 | 6 |

(Parts by Mass)

TABLE 2

|  | Composition | Comparative Example 1 | Comparative Example 2 | Comparative Example 3 | Comparative Example 4 | Comparative Example 5 |
|---|---|---|---|---|---|---|
| Matrix | Fluororubber (with Vulcanizing Agent) | 100 | 100 | 100 | 100 | 100 |
| Acid Acceptor | High Activity Magnesium Oxide | 25 | — | 20 | 12.5 | 5 |
|  | Low Activity Magnesium Oxide | — | — | — | — | — |
|  | Zinc Oxide | — | — | — | — | 20 |
| Dehydrating Agent | Calcium Oxide A | — | 25 | 5 | 12.5 | — |
|  | Calcium Oxide B | — | — | — | — | — |
| Vulcanization Accelerator | Calcium Hydroxide | 6 | 6 | 6 | 6 | 6 |

(Parts by Mass)

TABLE 3

|  | Composition | Trade Name | Company Name |
|---|---|---|---|
| Matrix | Fluororubber (with Vulcanizing Agent) | DAI-EL G-716 | Daikin Industries, Ltd. |
| Acid Acceptor | High Activity Magnesium Oxide | Kyowamag MF-150 | Kyowa Chemical Industry Co., Ltd |
|  | Low Activity Magnesium Oxide | MAGSARAT #30 | Kyowa Chemical Industry Co., Ltd |
|  | Zinc Oxide | Zinc Oxide | SEIDO CHEMICAL INDUSTRY CO., LTD. |
| Dehydrating Agent | Calcium Oxide A | QC-X | Inoue Calcium. Co. Ltd |
|  | Calcium Oxide B | VESTA-PP | Inoue Calcium. Co. Ltd |
| Vulcanization Accelerator | Calcium Hydroxide | NICC#5000 | Inoue Calcium. Co. Ltd |

(Evaluation Method)

A corrosion test for iron plates was performed in the following manner using the fluororubber sheets of Examples 1 to 5 and Comparative Examples 1 to 5 instead of performing a corrosion test for heating platens. Test samples used were the fluororubber sheets each having on its both upper and lower surfaces needle punched non-woven fabric made of aromatic polyamide fibers and having a basis weight of 680 g/m$^2$, "Conex KS680" (TEIJIN LIMITED). As a test method, each test sample sandwiched between two iron plates was continuously heated and pressed from above and below. The iron plates used were 320 mm×320 mm SS400 carbon steel plates with a thickness of 1.5 mm.

Figures 2, 3:
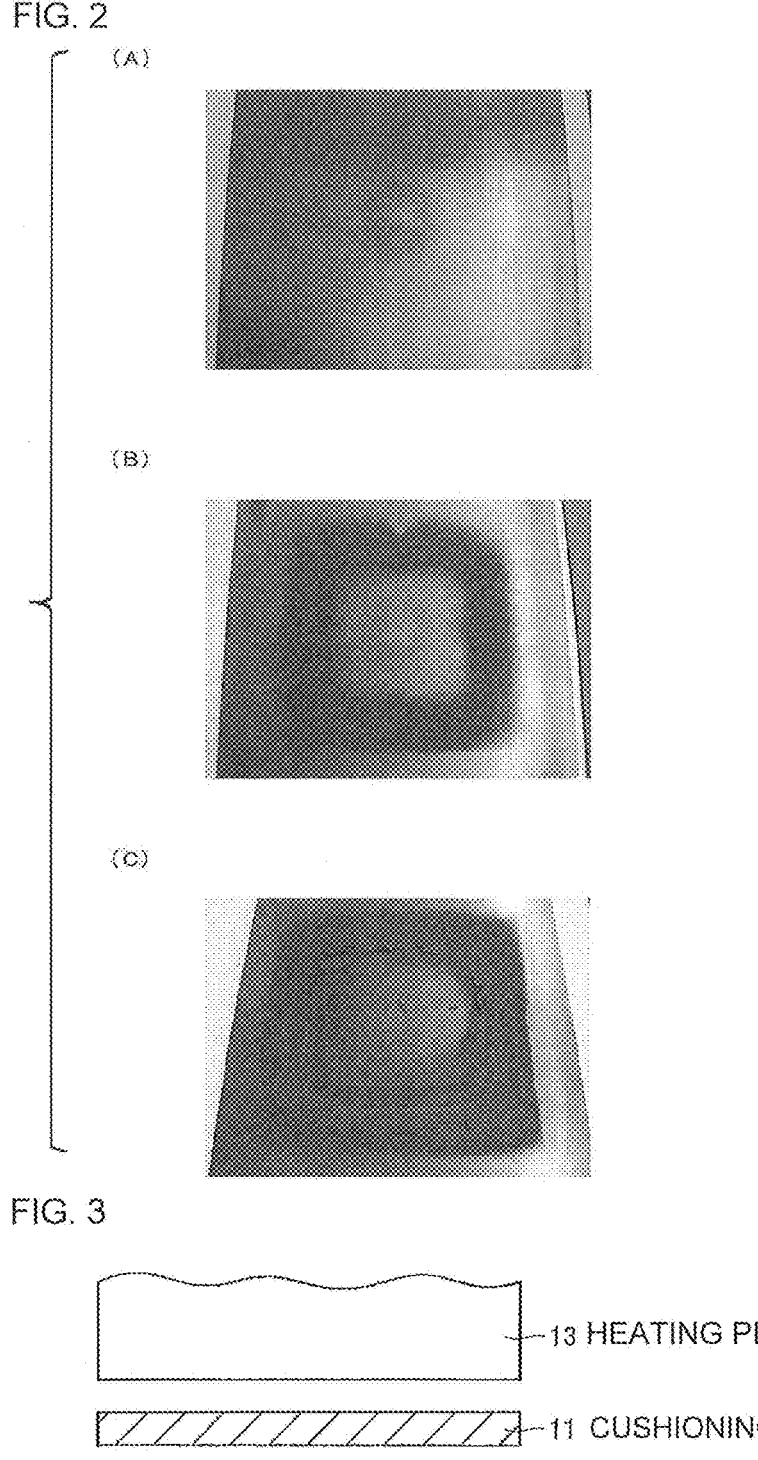
FIG. 2 shows iron plates in examples as viewed in plan, where (A) shows an iron plate with neither corrosion nor discoloration observed, (B) shows an iron plate with corrosion or discoloration observed, and (C) shows an iron plate rusted to the inside with corrosion or chippings observed.
FIG. 3 illustrates a hot press process.

The heating and pressing was performed under the following conditions: temperature: 270° C., and pressure: 2.5 MPa. After 48 hours passed under these conditions, the samples were removed every 24 hours to see if the iron plates were corroded. The results are shown in Table 4 below. In Table 4, "A" indicates an iron plate with neither corrosion nor discoloration observed, "B" indicates an iron plate with discoloration due to rust observed, and "C" indicates an iron plate rusted to the inside with chippings due to corrosion observed. An example of "A" is shown in FIG. 2(A), an example of "B" is shown in FIG. 2(B), and an example of "C" is shown in FIG. 2(C). Whether the iron plates were discolored was visually determined based on whether the metal of the iron plates was glossy.

Examples 1 to 3 with a mass ratio of the acid acceptor to the dehydrating agent of 1:4 and Examples 4 and 5 with a mass ratio of the acid acceptor to the dehydrating agent of 2:3 than when using Comparative Example 3 with a mass ratio of the acid acceptor to the dehydrating agent of 4:1 and Comparative Example 4 with a mass ratio of the acid acceptor to the dehydrating agent of 1:1. This result shows that it is preferable that the mass ratio of magnesium oxide as an acid acceptor to calcium oxide as a dehydrating agent be magnesium oxide:calcium oxide=1:4 to 2:3.

The iron plates were less likely to corrode when using Examples 1 and 4 containing high activity magnesium oxide with a BET specific surface area of 119 m$^2$/g as an acid acceptor than when using Examples 3 and 5 containing low activity magnesium oxide with a BET specific surface area of 42 m$^2$/g as an acid acceptor. This result shows that high activity magnesium oxide is more preferable than low activity magnesium oxide when using magnesium oxide as an acid acceptor.

As described above, it was verified from the Examples that corrosion of iron plates under the heating and pressing conditions can be reduced by adding an acid acceptor and a dehydrating agent to fluororubber. Accordingly, the hot press cushioning material of the present invention using fluororubber mixed with an acid acceptor and a dehydrating agent can reduce corrosion of heating platens even when used at high temperatures.

TABLE 4

| Time (h) | Example1 | Example2 | Example3 | Example4 | Example5 | Comparative Example 1 | Comparative Example 2 | Comparative Example 3 | Comparative Example 4 | Comparative Example 5 |
|---|---|---|---|---|---|---|---|---|---|---|
| 48 h | A | A | A | A | A | A | A | A | A | B |
| 72 h | A | A | A | A | A | B | A | B | B | B |
| 96 h | A | A | B | A | B | C | B | C | C | C |
| 120 h | B | A | B | B | B | — | B | — | — | — |
| 144 h | B | B | B | B | B | — | C | — | — | — |
| 168 h | B | B | B | B | B | — | — | — | — | — |

(Measurement Results)

As shown in Table 4, the iron plates were less likely to corrode when using Examples 1 to 3 containing both the acid acceptor and the dehydrating agent at a mass ratio of the acid acceptor to the dehydrating agent of 1:4 and Examples 4 and 5 containing both the acid acceptor and the dehydrating agent at a mass ratio of the acid acceptor to the dehydrating agent of 2:3 than when using Comparative Examples 1 and 5 containing only the acid acceptor and Comparative Example 2 containing only the dehydrating agent.

In the case where magnesium oxide was used as an acid acceptor and calcium oxide was used as a dehydrating agent, the iron plates were less likely to corrode when using <Press Durability Test>

Table 5 shows the results of a press durability test for Example 6 and Comparative Example 6.

Example 6

A hot press cushioning material of Example 6 has such a configuration as shown in FIG. 1(D), and includes two base material layers (cushioning material bodies) made of a fiber-rubber composite material, an adhesive material layer bonding the two base material layers together, and surface layers (surface layer material) attached to the front and back surfaces of the two base material layers. Accordingly, two cushioning material bodies, an adhesive material, and two surface layer material are prepared in order to produce the hot press cushioning material of Example 6.

Specifically, glass woven fabric using bulked yarn, "T860" (made by UNITIKA LTD.) was prepared as a base material for the cushioning material bodies. The weft of the glass woven fabric is bulked yarn produced by bulking twisted yarn of count 305 tex composed of 3,200 E-glass fibers (fiber diameter: 6 μm), and the warp of the glass woven fabric is unbulked twisted yarn of count 135 tex composed of 1,600 E-glass fibers (fiber diameter: 6 μm). The glass woven fabric was double weave fabric. The glass woven fabric has a weight of 850 g/m², a thickness of 1.02 mm, and a void fraction of 67%. An unvulcanized fluororubber solution was also prepared by dissolving unvulcanized fluororubber having the composition of Example 1 at a predetermined concentration in a mixed solvent of butyl acetate, methyl ethyl ketone, and acetic acid. The glass woven fabric was immersed in the unvulcanized fluororubber solution and then squeezed by two rolls. Thereafter, the glass woven fabric thus impregnated with the unvulcanized fluororubber solution was sufficiently dried to remove the solvent. Two of the cushioning material bodies that would serve as the base material layers were produced in this manner.

The adhesive material that would serve as the adhesive material layer was prepared by applying unvulcanized fluororubber having the composition of Example 1 to both upper and lower surfaces of a base material made of glass cloth with a thickness of 0.2 mm.

The surface layer material that would serve as the surface layer was prepared by applying an adhesive made of unvulcanized fluororubber having the composition of Example 1 to the bonding surface of a base material made of glass cloth with a thickness of 0.2 mm and applying polyimide resin to the front surface of the base material. Two of the surface materials were produced in this manner.

With the adhesive material sandwiched between the above two cushioning material bodies and the surface layer materials placed on the front surface of the upper cushioning material body and the back surface of the lower cushioning material body, hot press was performed to vulcanize the unvulcanized fluororubber used in the base material layers, the adhesive material layer, and the surface layers to bond these layers together. The hot press cushioning material of Example 6 thus obtained had a thickness of 1.9 mm.

Comparative Example 6

A method for producing a hot press cushioning material of Comparative Example 6 is basically similar to Example 6, but in Comparative Example 6, the unvulcanized fluororubber having the composition of Comparative Example 1 was used instead of the unvulcanized fluororubber having the composition of Example 1. The hot press cushioning material of Comparative Example 6 had a thickness of 1.9 mm that is the same as Example 6.

(Evaluation Method)

A press durability test was performed for the hot press cushioning materials of Example 6 and Comparative Example 6 by using 280 mm×280 mm samples. The press conditions were as follows: temperature: 270° C., and pressure: 4.0 MPa. Specifically, heating platens were heated from 25° C. to 270° C. for 40 minutes, and were kept in that state for 30 minutes. The heating platens were then water cooled for 15 minutes while being kept pressed. After being pressed for a total of 85 minutes, the heating platens were left unpressed for one minute and then opened. A press machine used was a 150 t test press PEWF-15045 (made by KANSAI ROLL Co., Ltd.).

By using the above press cycle as single press, the cushioning properties of the hot press cushioning materials of Example 6 and Comparative Example 6 were evaluated before press (zero press) and after single press, 10 presses, 100 presses, 200 presses, 300 presses, and 400 presses.

Evaluation samples were 25 mmϕ in size, and each evaluation sample was collected at a position 5 cm or more from the edge of the 280 mm×280 mm sample pressed under the above conditions. The conditions for the cushioning property evaluation test were as follows: temperature 230° C., and pressure: 4.0 MPa. Specifically, the evaluation samples were preheated at 230° C. for 2 minutes at a pressure of 0.05 kgf/cm² and then pressed until 4.0 MPa at a pressing speed of 1 mm/min, and the amount of change in thickness of each evaluation sample was measured. A test apparatus used was an Instron Model 5565 universal testing system (made by Instron Japan Co., Ltd.).

The cushioning properties were evaluated by the amount of change in thickness from before pressing the sample for evaluating the cushioning properties to after pressing it until 4.0 MPa. The cushioning properties were determined to be high when the amount of change in thickness (μm) was large, and were determined to be low when the amount of change in thickness (μm) was small. The results of the press durability test are shown in Table 5. For the Comparative Example, the test was ended after 200 presses since the cushioning properties degraded significantly after 200 presses.

TABLE 5

| Number of Presses | | 0 | 1 | 10 | 100 | 200 | 300 | 400 |
|---|---|---|---|---|---|---|---|---|
| Cushioning | Example 6 | 726 | 606 | 532 | 511 | 482 | 473 | 468 |
| Properties (μm) | Comparative Example 6 | 678 | 567 | 493 | 466 | 361 | — | — |

(Measurement Results)

As shown in Table 5, the hot press cushioning material of Example 6 having the composition of Example 1 had higher overall cushioning properties than the hot press cushioning material of Comparative Example 6 having the composition of Comparative Example 1, and maintained high cushioning properties with no sharp degradation in cushioning materials observed until after 400 presses. On the other hand, the cushioning properties of Comparative Example 6 degraded significantly after 200 presses. This result shows that Example 6 containing not only the acid acceptor but also the dehydrating agent achieves improved heat resistance over Comparative Example 6 containing only the acid acceptor.

The embodiment and examples disclosed herein should be construed as illustrative but not restrictive in all respects. The scope of the present invention is not defined by the embodiment and examples but by the claims, and is intended to include all modifications within the meaning and scope equivalent to the claims.

REFERENCE SIGNS LIST 1A, 1B, 1C, 1D: Hot Press Cushioning Material, 2: Fluororubber Layer, 3: Non-Woven Fabric Layer, 4: Surface Layer, 5: Base Material Layer, 6: Adhesive Layer, 11: Cushioning Material, 12: Laminate Material, 13: Heating Platen

The invention claimed is:

1. A hot press cushioning material comprising fluororubber, wherein a composition of the fluororubber includes:

a fluororubber component;

a vulcanizing agent;

an acid acceptor comprising magnesium oxide present in an amount of 5 or more parts by mass per 100 parts by mass of a total of the fluororubber component and the vulcanizing agent; and a dehydrating agent comprising calcium oxide present in an amount of 15 or more parts by mass per 100 parts by mass of the total of the fluororubber component and the vulcanizing agent, wherein the amount of the dehydrating agent per 100 parts by mass of the total of the fluororubber component and the vulcanizing agent is larger than the amount of the acid acceptor, and a total amount of the acid acceptor and the dehydrating agent per 100 parts by mass of a total of the fluororubber component and the vulcanizing agent is 20 to 50 parts by mass.

2. The hot press cushioning material according to claim 1, wherein the amount of the dehydrating agent per 100 parts by mass of the total of the fluororubber component and the vulcanizing agent is 1.5 times or more the amount of the acid acceptor.

3. The hot press cushioning material according to claim 1, wherein a mass ratio of the magnesium oxide to the calcium oxide is the magnesium oxide: the calcium oxide=1:4 to 2:3.

4. The hot press cushioning material according to claim 1, wherein the magnesium oxide has a BET specific surface area of 80 $m^2$/g or more and 300 $m^2$/g or less.

5. The hot press cushioning material according to claim 1, wherein a heat resistant temperature of the hot press cushioning material is 250° C. or more and 300° C. or less.

* * * * *